A. P. QUARNSTROM.
REVERSING MECHANISM.
APPLICATION FILED FEB. 24, 1913.
1,115,568.
Patented Nov. 3, 1914.
2 SHEETS—SHEET 1.
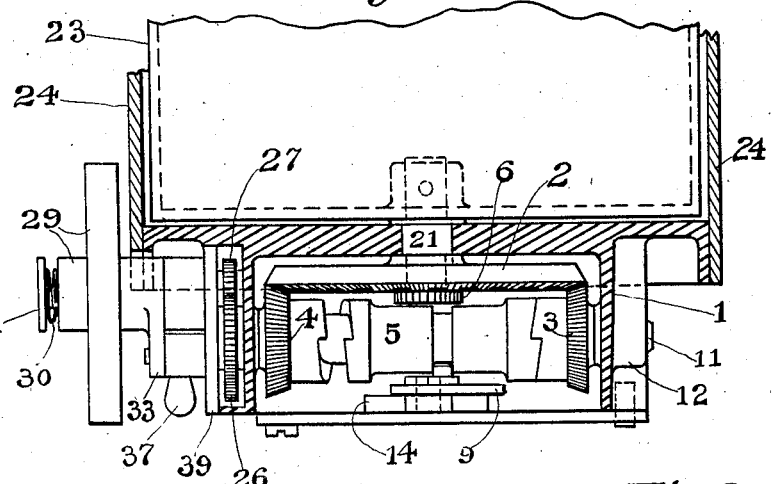
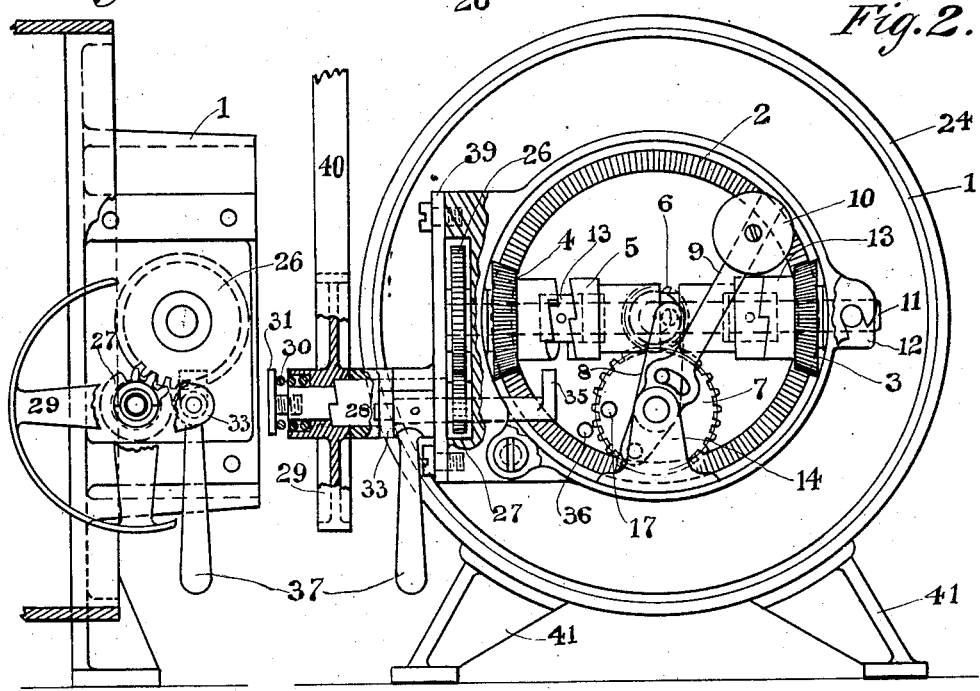
WITNESSES:
INVENTOR
Andrew P. Quarnstrom

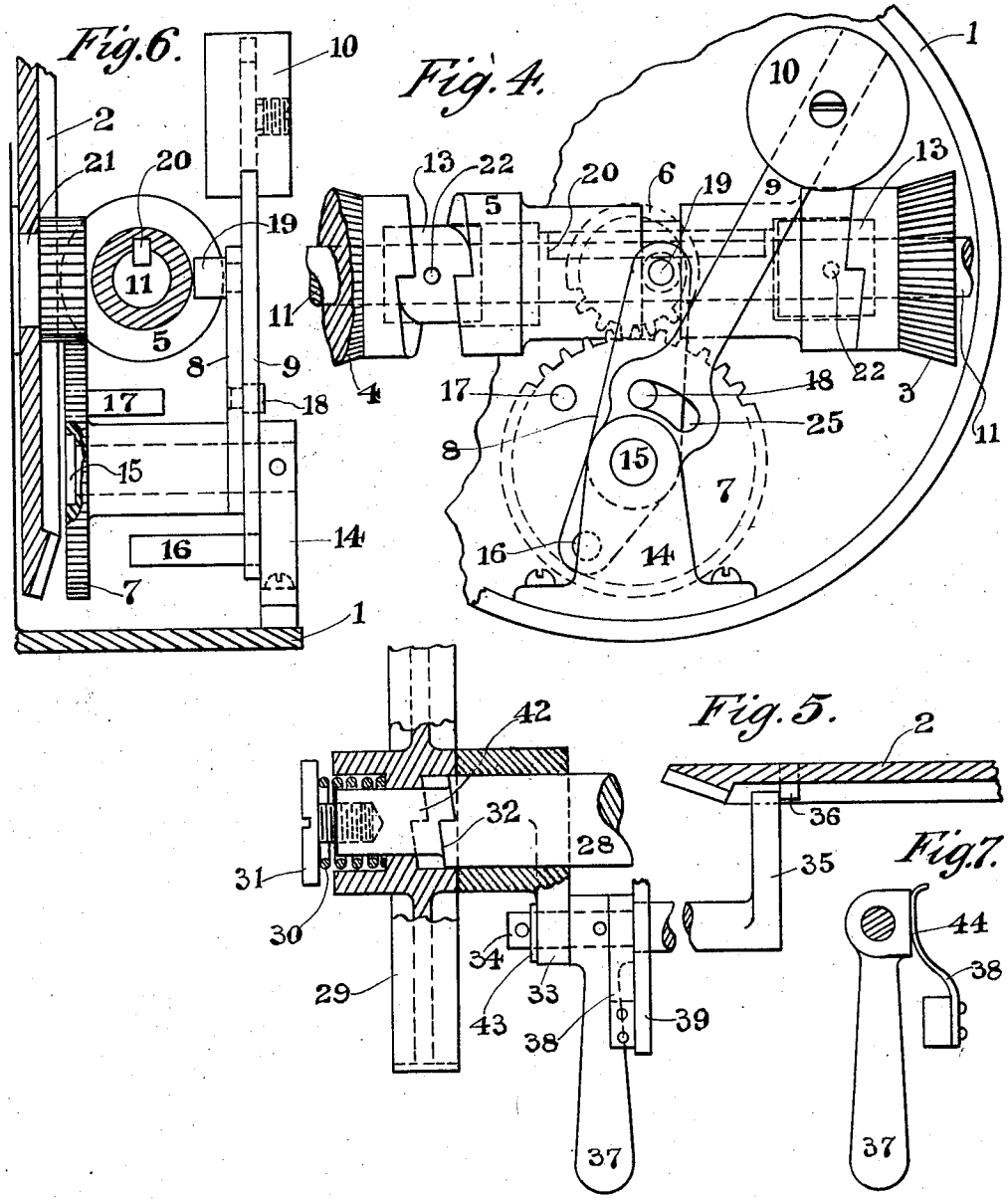

UNITED STATES PATENT OFFICE.

ANDREW P. QUARNSTROM, OF NEW YORK, N. Y.

REVERSING MECHANISM.

1,115,568.    Specification of Letters Patent.    Patented Nov. 3, 1914.

Application filed February 24, 1913. Serial No. 750,453.

*To all whom it may concern:*

Be it known that I, ANDREW P. QUARNSTROM, formerly a subject of the King of Sweden and now in the United States, with the intention of becoming a citizen of the United States, residing at 4907 Seventh avenue, Brooklyn, in the county of Kings, city of New York, N. Y., United States of America, have invented a new and useful Reversing Mechanism, of which the following is a specification.

My invention relates to reversing mechanism, and the object is to simplify the construction of the same whereby the operation is more effective, more sensitive and more positive.

Another object is to provide the reversing mechanism with an automatic stop-mechanism.

Referring to the drawing: Figure 1 is a plan view of my device, the casing and cylinder being shown in section. Fig. 2 is a front view of the reversing mechanism, the driving gear case being shown in section and the driving pulley being shown partly in section. Fig. 3 is a side view showing the driving pulley partly broken away, and the driving gear wheel meshing with the driving pinion. Fig. 4 is an enlarged detail view of the reversing mechanism. Fig. 5 is a detail view of the automatic stop-device. Fig. 6 is an enlarged side view of the reversing mechanism. Fig. 7 is an enlarged fragmentary side view of the stop-device-lever.

The frame work consists of the casing or head, 1, made preferably of iron. The stationary cylinder 24 is fastened to the head 1. 41 are legs supporting said cylinder. Within the cylinder revolves the container, 23, connected to the reversing mechanism by the stud or shaft 21 secured to the hub of the said cylinder. Said shaft has keyed thereon the large bevel gear 2.

At opposite sides of the gear 2 are located the bevel pinions 3 and 4, mounted loosely on the driving shaft 11, and adapted to mesh with the bevel gear 2. The bevel pinions are held in position on the shaft 11 by the collars 13 and pins 22. The shaft 11 has bearing supports in the boss 12 and the plate 39 integral with the head 1. The hubs of pinions 3 and 4 are each provided with clutch-teeth.

5 is a sleeve loosely sliding on a keyway on the shaft 11. The ends of this sleeve 5 have clutch teeth engaging with the clutch teeth of the pinions 3 and 4. Now, if the sleeve 5 is moved lengthwise its clutch teeth will engage with the teeth of the pinion 3, causing the said sleeve and pinion to rotate together; and the pinion 4 on the opposite side to run loosely—or vice-versa. The shaft 11 is driven by the gear 26, keyed thereon; the gear 26 is driven by the pinion 27 mounted on the shaft 28 having a bearing in the plate 39. The outer end of the shaft 28 is provided with clutch teeth 32.

29 is the driving pulley on the shaft 28, the hub thereof being provided with clutch teeth 42 meshing with clutch teeth 32 on the shaft 28.

40 is the driving belt actuated by any class of motors.

The reversing clutch sleeve 5 is operated thus: On the shaft 21 is mounted the pinion 6 adapted to mesh into the gear 7 mounted loosely on the stud 15 secured on the bracket 14, suitably mounted on the casing head. On the stud 15 are pivoted the actuating arms 8 and 9. The upper end of the arm 8 is provided with the stud 19 operating in a groove cut into the clutch sleeve 5. Between the studs 15 and 19 on the arm 8 is placed the stud 18 engaging an oblong slot 25 cut in the arm 9. 16 is another stud placed in the lower end of the arm 9. 17 is another stud placed in gear 7, both the same radius from the stud 15. Now, as the bevel pinion 3 rotates the gear 2 it will rotate the pinion 6 and the gear 7 until the stud on the gear 7 coming in contact with the stud 16 on the arm 9, when it will cause the said arm to swing slowly on the stud 15 until the said arm stands perpendicular. The arm 9 swings to the left or right according to the position of the clutch sleeve 5, additional momentum being given by the adjustable weight 10 on the said arm 9. When the arm 9 swings (left or right) it carries with it the arm 8 through the stud 18, which automatically slides sleeve 5 to the right or left, engaging the clutches on the ends thereof, with the clutches on the pinions 3—4, and as they are engaged by the automatic, swinging of the arm 9 by the contact of the stud 17 with the stud 16, so will the cylinder be revolved in opposite directions, throughout the operation of the above mechanism.

The inner end of the pulley 29 is provided with collar having an arm 33 acting as a bearing for the shaft 34, (loose on the said arm,) and kept in place by the collar 43 secured by pin passing through the shaft 34. The opposite end of arm 33 has a lever 37 adapted to turn the shaft 34. The shaft 34 has an arm 35, adapted to coact with a stud 36 on the gear 2, situated in relation to the openings in the cylinders 23—24. The stud 36 is straight on one side and bevel on the other side. The object is to allow pin 36 to pass over 35 when turning to the right and coact when turning left.

When the machine is in operation the arm 35 stands perpendicular (see Fig. 1). To stop the machine raise the lever 37. This brings the said arm 35 in contact with the stud on the gear 2, forcing the clutch teeth 42 away from the clutch 32 on the shaft 28, thus stopping the reversing mechanism, as the pulley 29 now runs as an idler. The bearing end 44 of lever 37 is flattened (see Fig. 7) and acting against this flat portion is a spring 38 suitably mounted on the casing, thus firmly holding the said lever 37 in the position, horizontally. To start the machine, again, simply throw the lever 37 perpendicularly again. This releases arm 35 on the gear 2; and the pulley is then forced forward by the spring 30, in the hub of the pulley 29, thereby causing the clutch on the pulley 42 to engage the teeth 32 on the shaft 28, driving again the reversing mechanism above. The tension screw 31, governs the coil spring 30.

I am aware that previous to my invention, reversing mechanisms have been made, for use of various kinds of machinery, including washing machines, for which my invention is especially designed or constructed, but not so far as I know, the same as mine.

What I claim as new, and desire to secure by Letters Patent is:

1. In a reversing mechanism, the combination of a stationary frame, driving and driven shafts journaled in the frame, a bevel gear on the driven shaft, bevel pinions having clutch faces loose on the driving shaft, a clutch member splined on the driving shaft, means for shifting the clutch member to engage either of the clutch faces on the bevel pinions, comprising a standard on the frame, an arm pivoted to the standard and engaging the clutch member, a weighted arm pivoted to the standard, a connection between the first mentioned arm and the weighted arm, and means for oscillating the weighted arm.

2. In reversing gearing, the combination of a driving shaft, a driven shaft, a gear on the driven shaft, gears loosely mounted on the driving shaft and engaging the first mentioned gear, clutch faces on the last named gears, a clutch member splined on the driving shaft, a pinion on the driven shaft, a gear engaging the pinion, a pin on the gear, clutch shifting means, and a pin on the clutch shifting means adapted to be engaged by the pin on the gear.

Signed this 15th day of February nineteen hundred and thirteen (1913) before two subscribing witnesses.

ANDREW P. QUARNSTROM.

Witnesses:
FRANK LALLY,
JAMES D. KING.

Copies of this patent may be obtained for five cents each, by addressing the "Commissioner of Patents, Washington, D. C."